United States Patent
Nagahama et al.

(10) Patent No.: US 7,164,894 B2
(45) Date of Patent: Jan. 16, 2007

(54) RECEIVER CAPABLE OF SWITCHING BETWEEN DIGITAL AND ANALOG BROADCASTING SIGNALS

(75) Inventors: Hiroyuki Nagahama, Tokyo (JP); Soichi Nagano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 450 days.

(21) Appl. No.: 10/751,483

(22) Filed: Jan. 6, 2004

(65) Prior Publication Data
US 2004/0185813 A1 Sep. 23, 2004

(30) Foreign Application Priority Data
Jan. 10, 2003 (JP) .............................. 2003-004912

(51) Int. Cl.
H04H 1/00 (2006.01)
H04B 1/18 (2006.01)

(52) U.S. Cl. ............................... 455/168.1; 455/180.1; 455/3.01

(58) Field of Classification Search ................. 455/45, 455/61, 3.01, 203, 47, 150.1, 132, 142, 204, 455/168.1, 180.1, 130; 375/270, 301, 316, 375/277, 321
See application file for complete search history.

(56) References Cited

U.S. PATENT DOCUMENTS

| | | | | |
|---|---|---|---|---|
| 6,005,894 A | * | 12/1999 | Kumar | ....................... 375/270 |
| 6,351,500 B1 | * | 2/2002 | Kumar | ....................... 375/270 |
| 6,466,776 B1 | * | 10/2002 | Okanobu | .................. 455/343.2 |
| 6,813,310 B1 | * | 11/2004 | Okanobu | ..................... 375/216 |
| 2004/0022229 A1 | * | 2/2004 | Vanness | ....................... 370/343 |
| 2004/0261132 A1 | * | 12/2004 | Shimizu | ...................... 725/139 |
| 2005/0020220 A1 | * | 1/2005 | Gamou | ....................... 455/132 |
| 2005/0113049 A1 | * | 5/2005 | Takayama et al. | ........ 455/150.1 |
| 2005/0232431 A1 | * | 10/2005 | Kato | .............................. 381/2 |
| 2005/0272385 A1 | * | 12/2005 | Nagano et al. | .............. 455/143 |

FOREIGN PATENT DOCUMENTS

JP 2002-26756 A 1/2002

* cited by examiner

*Primary Examiner*—Sonny Trinh
(74) *Attorney, Agent, or Firm*—Sughrue Mion, PLLC

(57) ABSTRACT

A receiver includes an FFT analysis result/group delay characteristic determining unit for determining whether or not a group of carrier signals of a digital broadcasting signal satisfies predetermined requirements, and delivers a requirement satisfaction determination signal indicating the determining result. When receiving the requirement satisfaction determination signal indicating that the group of carrier signals doesn't satisfy the predetermined requirements while the receiver is selectively receiving the digital broadcasting signal, a switching circuit switches to the reception of an analog broadcasting signal. In contrast, when receiving the requirement satisfaction determination signal indicating that the group of carrier signals satisfies the predetermined requirements while the receiver is selectively receiving the analog broadcasting signal, the switching circuit switches to the reception of the digital broadcasting signal.

11 Claims, 11 Drawing Sheets

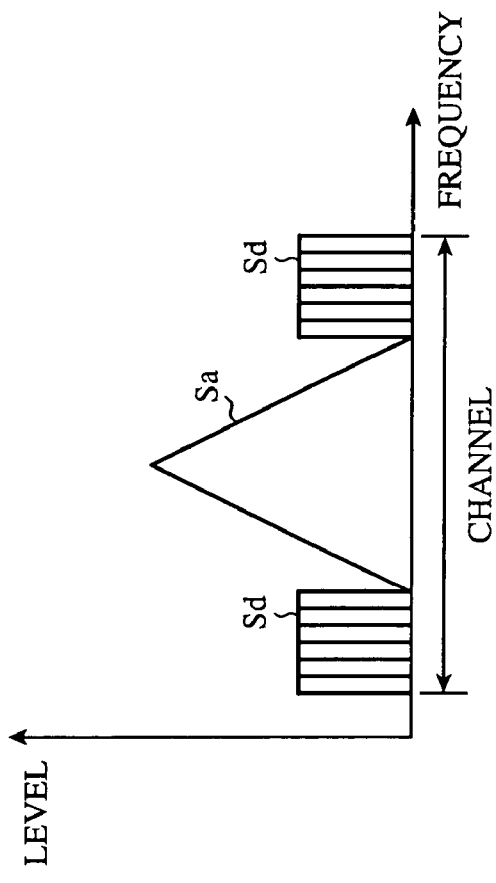
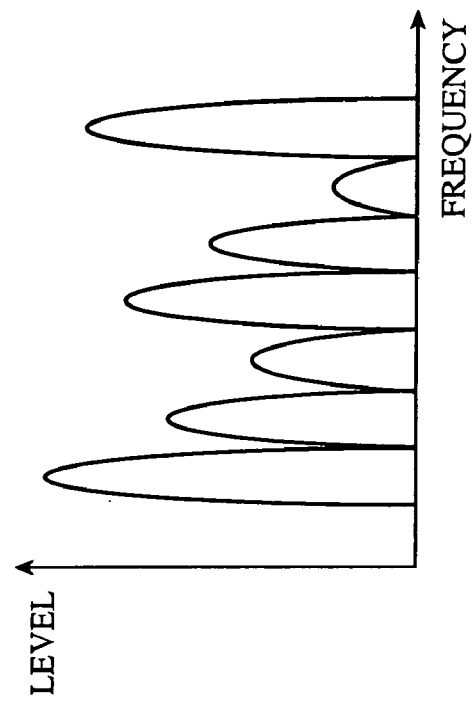
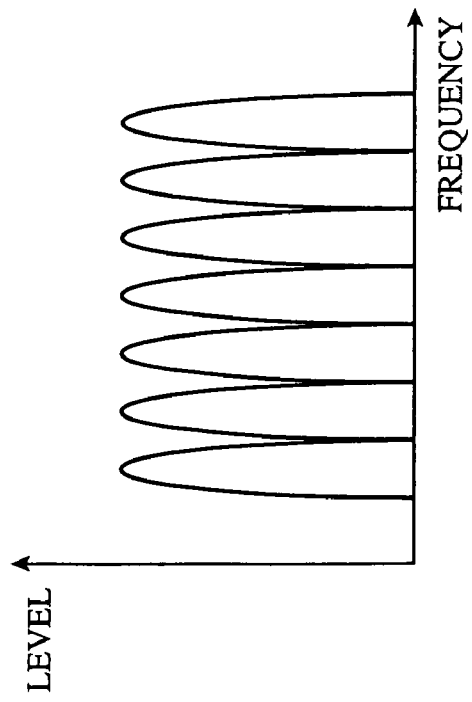

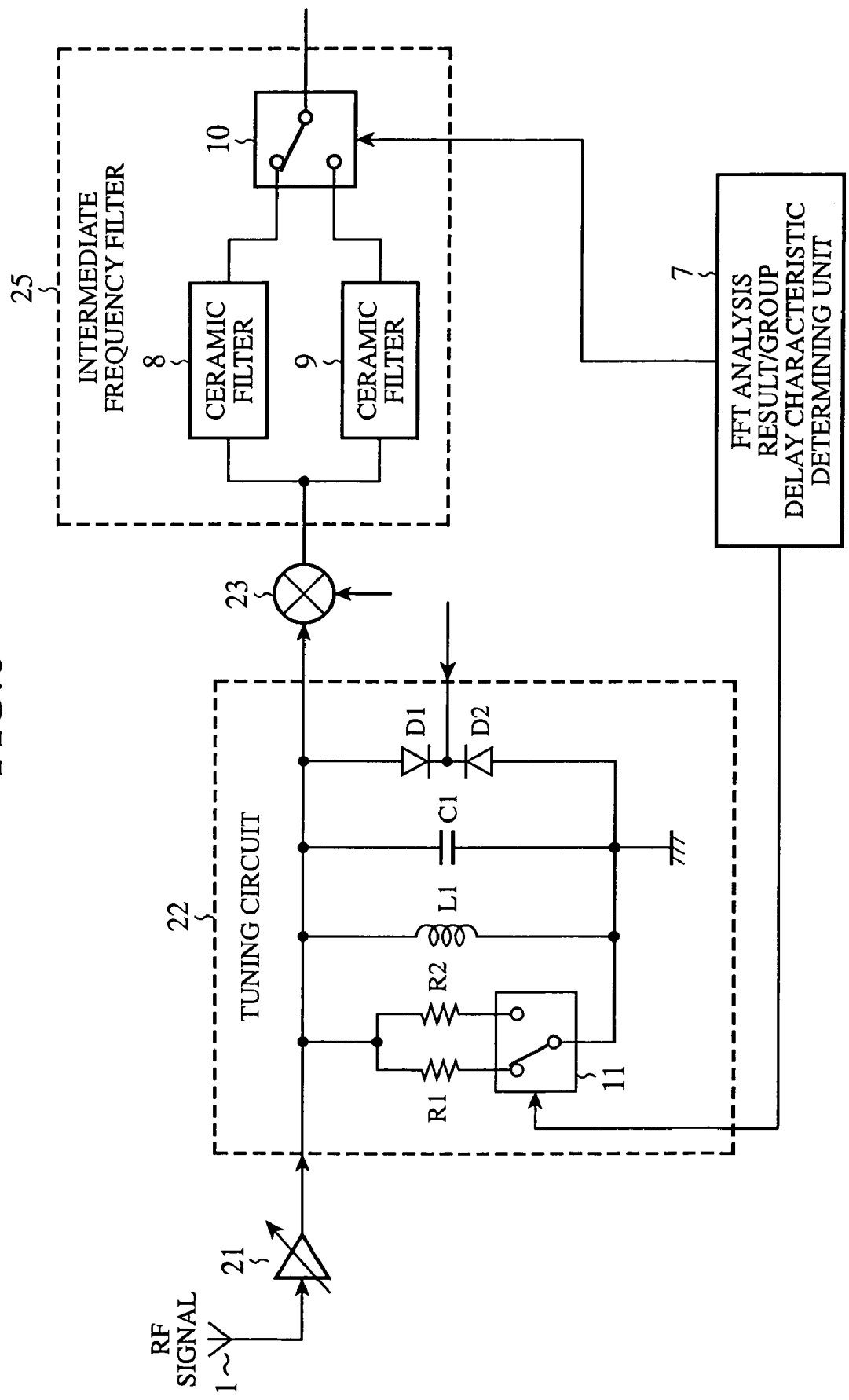

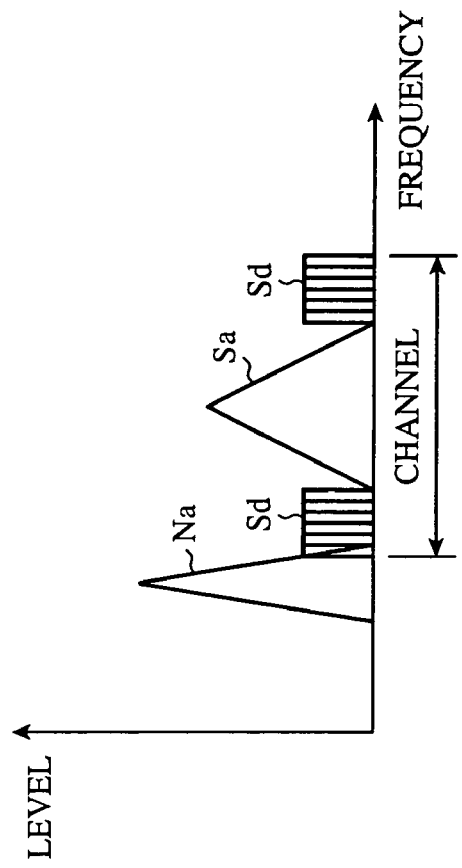
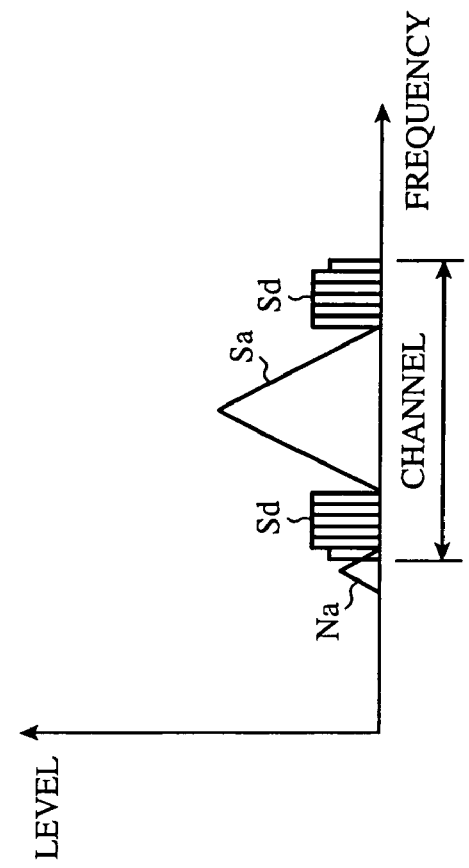
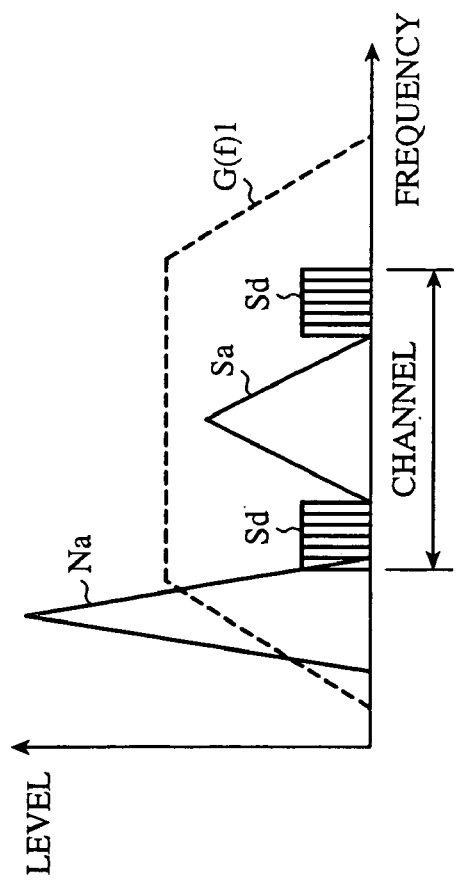
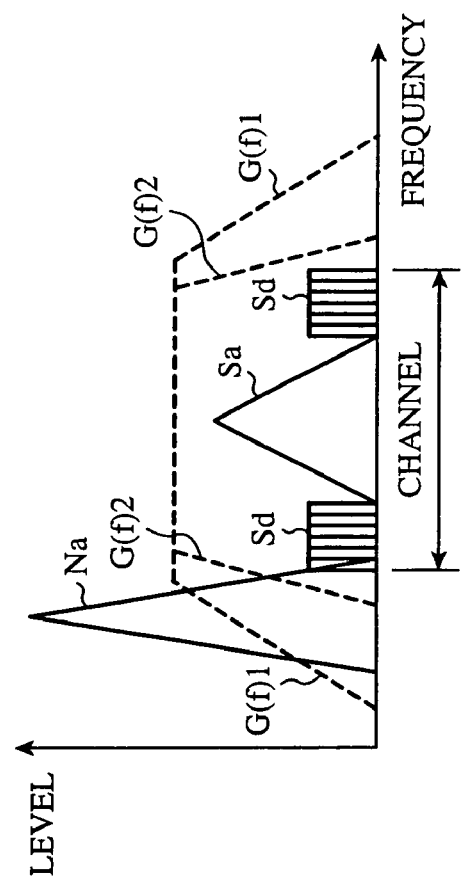

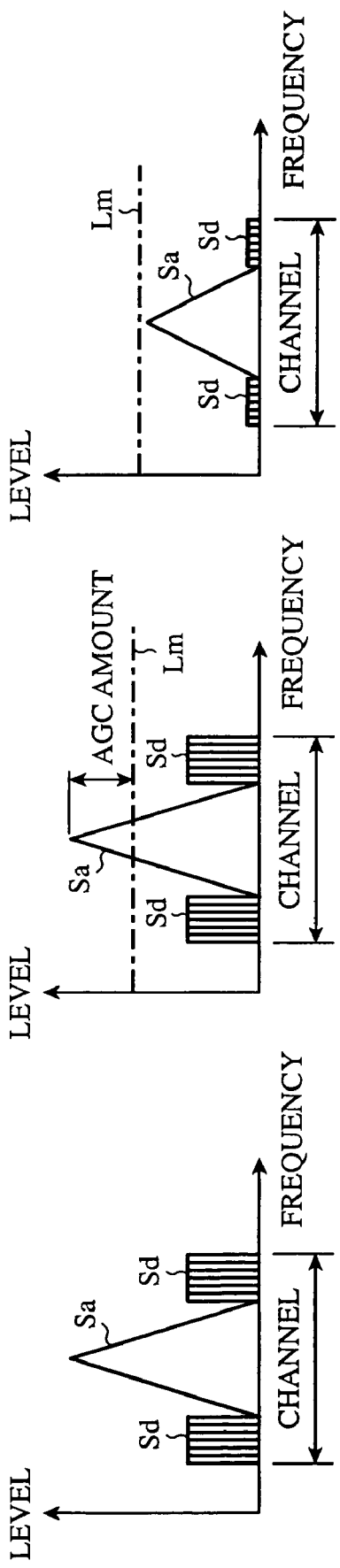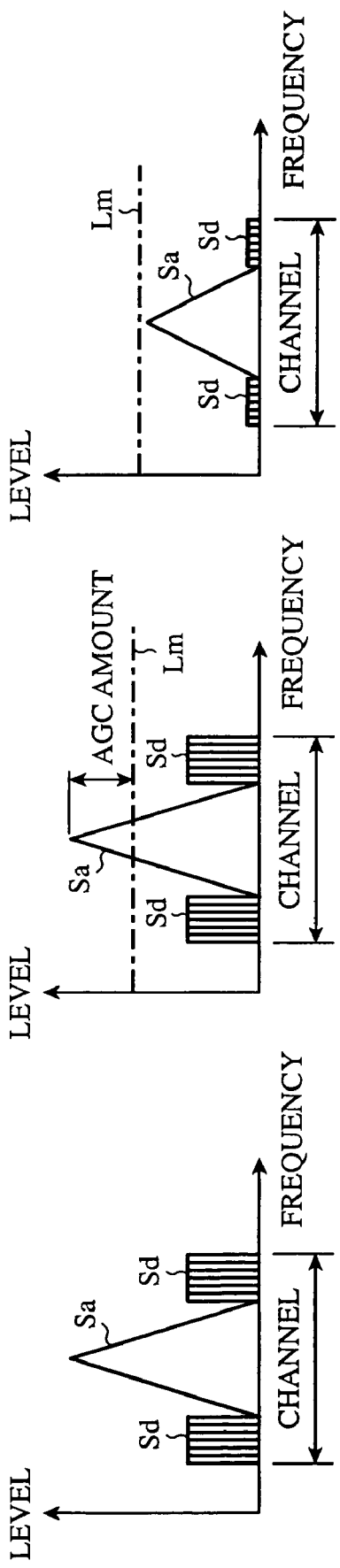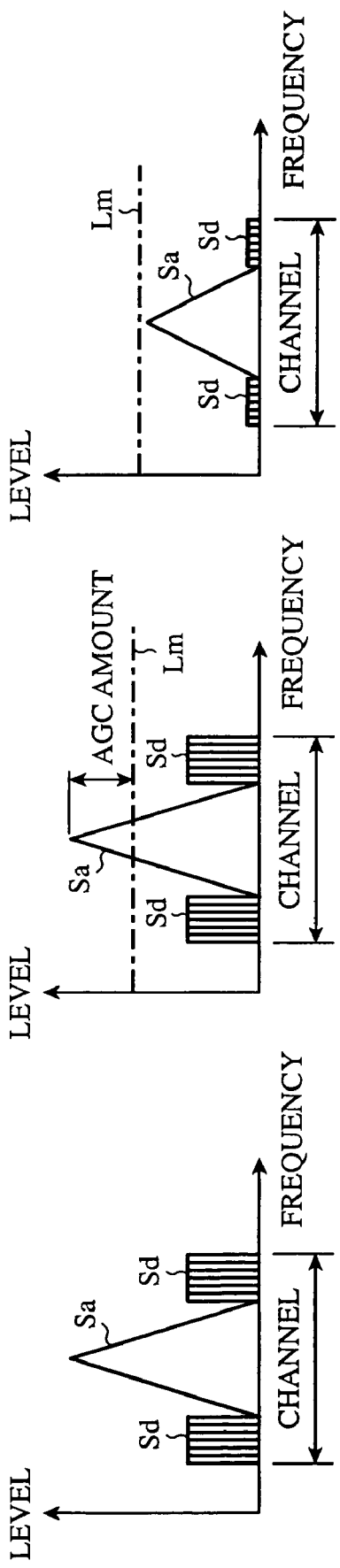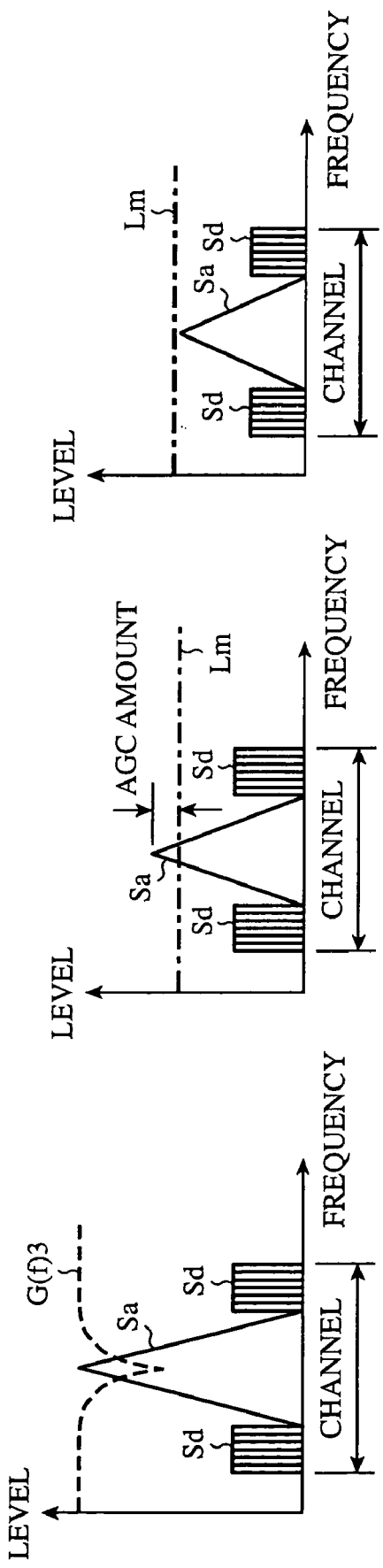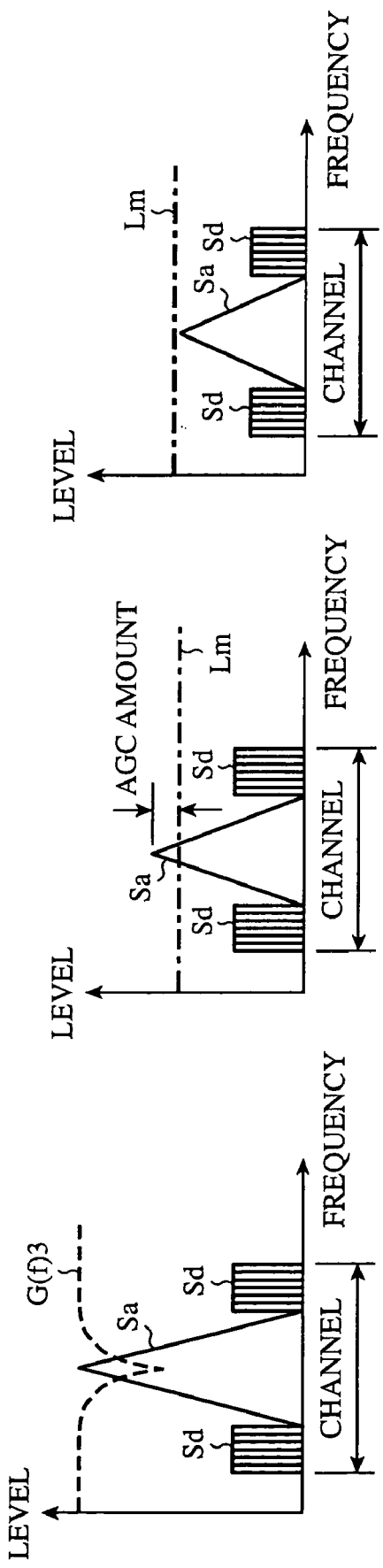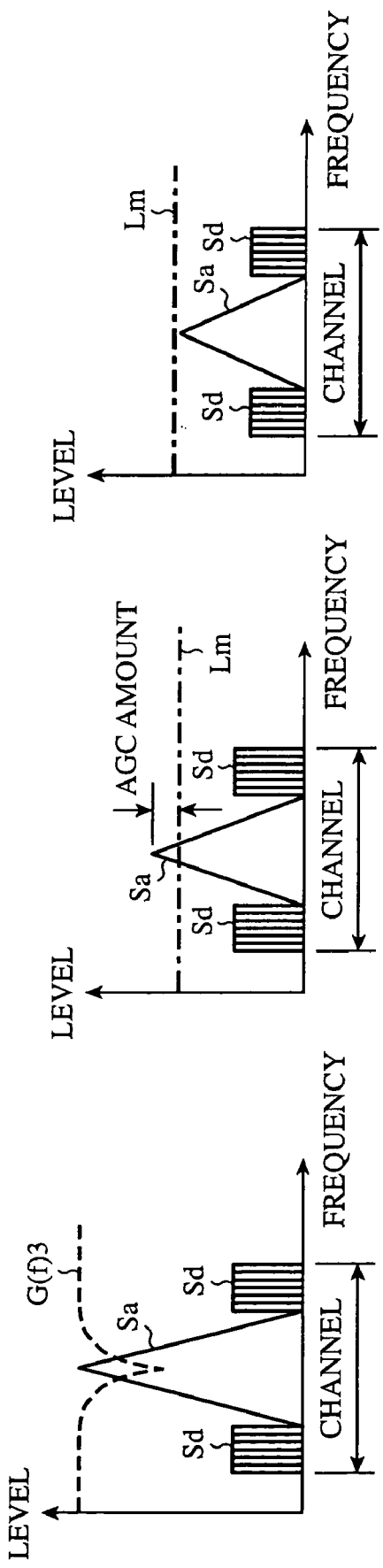

RECEIVER CAPABLE OF SWITCHING BETWEEN DIGITAL AND ANALOG BROADCASTING SIGNALS

BACKGROUND OF THE INVENTION

1. Field of the Invention

The present invention relates to a receiver that can selectively receive either a digital broadcasting signal or an analog broadcasting signal.

2. Description of Related Art

Systems for delivering both digital broadcast and analog broadcast at the same time have been proposed. For example, in accordance with an IBOC (In Band On Channel) system proposed by iBiquity Digital Corporation in the United States, a digital broadcast signal is transmitted via a channel associated with an analog broadcast. In this case, the digital broadcasting signal is transmitted with lower power than that with which an analog broadcasting signal is transmitted so that no influence is exerted upon the analog broadcasting signal. In other words, both an analog broadcasting signal having a large amplitude and a digital broadcasting signal that consists of a number of carriers each having a small amplitude exist together in a channel (i.e., a frequency range) located in the vicinity of the centre frequency of the analog broadcasting signal with respect to frequency. A prior art receiver that can receive broadcasts provided such an IBOC system receives an RF signal including both a digital broadcasting signal and an analog broadcasting signal, and a common tuner unit of the receiver converts the RF signal into an intermediate frequency signal by using an RF amplifier, a mixer, an intermediate frequency filter, and so on. This intermediate frequency signal is supplied to both a digital demodulating unit and an analog demodulating unit, and also becomes a feedback signal applied to an AGC or gain control circuit included in the RF amplifier of the tuner unit. As previously mentioned, digital broadcasting signals have amplitudes different from those of analog broadcasting signals, and a problem with the prior art receiver is therefore that the AGC circuit cannot carry out proper gain control because an intermediate frequency signal that contains both a digital broadcasting signal and an analog broadcasting signal is fed back to the AGC circuit.

Japanese patent application publication (TOKKAI) No. 2002-26756 (see paragraph number "0111") discloses a broadcast receiver for properly controlling both a gain for digital broadcasting signals and a gain for analog broadcasting signals. The broadcast receiver is provided with an amplitude measurement unit for measuring a first amplitude value indicating the amplitude of an analog broadcasting signal and a second amplitude value indicating the amplitude of a digital broadcasting signal, and for outputting both the first amplitude value and the second amplitude value, and a broadcasting system determining unit for determining whether a broadcasting signal selected by an RF amplifier is an analog broadcasting signal or a digital broadcasting signal based on an intermediate frequency signal obtained from an RF signal including the analog broadcasting signal and the digital broadcasting signal. The amplitude measurement unit measures the first amplitude value of the intermediate frequency signal in a frequency band including the centre frequency of the intermediate frequency signal, and measures the second amplitude value of the intermediate frequency signal in a frequency band that is placed off center from the centre frequency of the intermediate frequency signal. The broadcast receiver then selects either the first amplitude value or the second amplitude value according to an output of the broadcasting system determining unit, and generates an AGC voltage based on the selected amplitude value.

However, in some cases, the prior art receiver cannot properly determine whether a broadcasting signal selected by the RF amplifier is an analog broadcasting signal or a digital broadcasting signal under the influence of interfering waves because the receiver is so constructed as to carry out the determination processing based on an intermediate frequency signal. In other words, there is a possibility that even if the digital broadcasting signal has a smaller amplitude than a predetermined value, the digital broadcasting signal apparently has a larger amplitude under the influence of interfering waves or the like, and the prior art receiver then determines that it can receive the digital broadcasting signal. Furthermore, the prior art broadcast receiver can accept both a digital broadcasting signal and an analog broadcasting signal associated with the same television program, and select the digital broadcasting signal under good electric wave reception conditions. When the electric wave reception conditions become worse, the prior art broadcast receiver can automatically switch to the reception of the analog broadcasting signal that serves as backup. However, the prior art broadcast receiver cannot carry out an appropriate switching operation under the influence of interfering waves or the like.

SUMMARY OF THE INVENTION

The present invention is proposed to solve the above-mentioned problems, and it is therefore an object of the present invention to provide a receiver that can appropriately switch between reception of a digital broadcasting signal and reception of an analog broadcasting signal according to electric wave reception conditions.

It is another object of the present invention to provide a receiver that can carry out appropriate band control when accepting both a digital broadcasting signal and an analog broadcasting signal at the same time.

In accordance with the present invention, there is provided a receiver that accepts a high frequency signal containing both a digital broadcasting signal and an analog broadcasting signal which are associated with one channel and converts the high frequency signal into an intermediate frequency signal, the receiver comprising: a carrier determining unit for determining whether a group of carrier signals of the digital broadcasting signal, which is included in the intermediate frequency signal, satisfies a predetermined requirement so as to generate a requirement satisfaction determination signal indicating a determination result; and a switching unit for, when the requirement satisfaction determination signal delivered thereto from the carrier determination unit indicates that the group of carrier signals doesn't satisfy the predetermined requirement while the receiver is selectively receiving the digital broadcasting signal, switching to reception of the analog broadcasting signal, and for, when the requirement satisfaction determination signal delivered thereto from the carrier determination unit indicates that the group of carrier signals satisfies the predetermined requirement while the receiver is selectively receiving the analog broadcasting signal, switching to reception of the digital broadcasting signal.

Therefore, the present invention offers an advantage of being able to appropriately switch between the reception of the digital broadcasting signal and the reception of the analog broadcasting signal according to electric wave reception conditions.

Further objects and advantages of the present invention will be apparent from the following description of the preferred embodiments of the invention as illustrated in the accompanying drawings.

BRIEF DESCRIPTION OF THE DRAWINGS

FIG. 2 is a diagram showing a spectrum of an RF signal containing both an analog broadcasting signal and a digital broadcasting signal;

FIG. 3A is a diagram showing a spectrum of a group of carrier signals included in an OFDM signal when the receiver in accordance with embodiment 1 of the present invention is not under the influence of interfering waves and fading;

FIG. 3B is a diagram showing a spectrum of a group of carrier signals included in an OFDM signal when the receiver in accordance with embodiment 1 of the present invention is under the influence of interfering waves and fading;

FIG. 6 is circuit diagram showing the structure of a part of a receiver in accordance with embodiment 2 of the present invention;

FIG. 7A is a diagram showing a spectrum of an RF signal associated with a selected channel when the receiver in accordance with embodiment 2 of the present invention receives a digital broadcast under the influence of analog interfering waves;

FIG. 7B is a diagram showing a spectrum of the RF signal when the receiver in accordance with embodiment 2 of the present invention switches from the reception of the digital broadcast to reception of an analog broadcast while maintaining the gain vs. frequency band characteristic of a tuner unit at G(f)1 as shown in FIG. 7A;

FIG. 8A is a diagram showing a spectrum of the RF signal when the receiver in accordance with embodiment 2 of the present invention receives a digital broadcast under the influence of analog interfering waves;

FIG. 8B is a diagram showing a spectrum of the RF signal when the receiver in accordance with embodiment 2 of the present invention switches from the reception of the digital broadcast to reception of an analog broadcast after changing the gain vs. frequency band characteristic of the tuner unit from G(f)1 to G(f)2 as shown in FIG. 8A;

FIGS. 12A to 12C are diagrams showing a transition of a spectrum of an intermediate frequency signal associated with a selected channel when the receiver in accordance with embodiment 3 of the present invention generates an AGC signal according to only the level of the intermediate frequency signal;

FIGS. 13A to 13C are diagrams showing a transition of a spectrum of the intermediate frequency signal when the receiver in accordance with embodiment 3 of the present invention generates an AGC signal according to both the level of a band control signal and the level of the intermediate frequency signal.

DETAILED DESCRIPTION OF THE PREFERRED EMBODIMENTS

The preferred embodiments of the invention will now be described with reference to the accompanying drawings.

Embodiment 1

Figure 1:
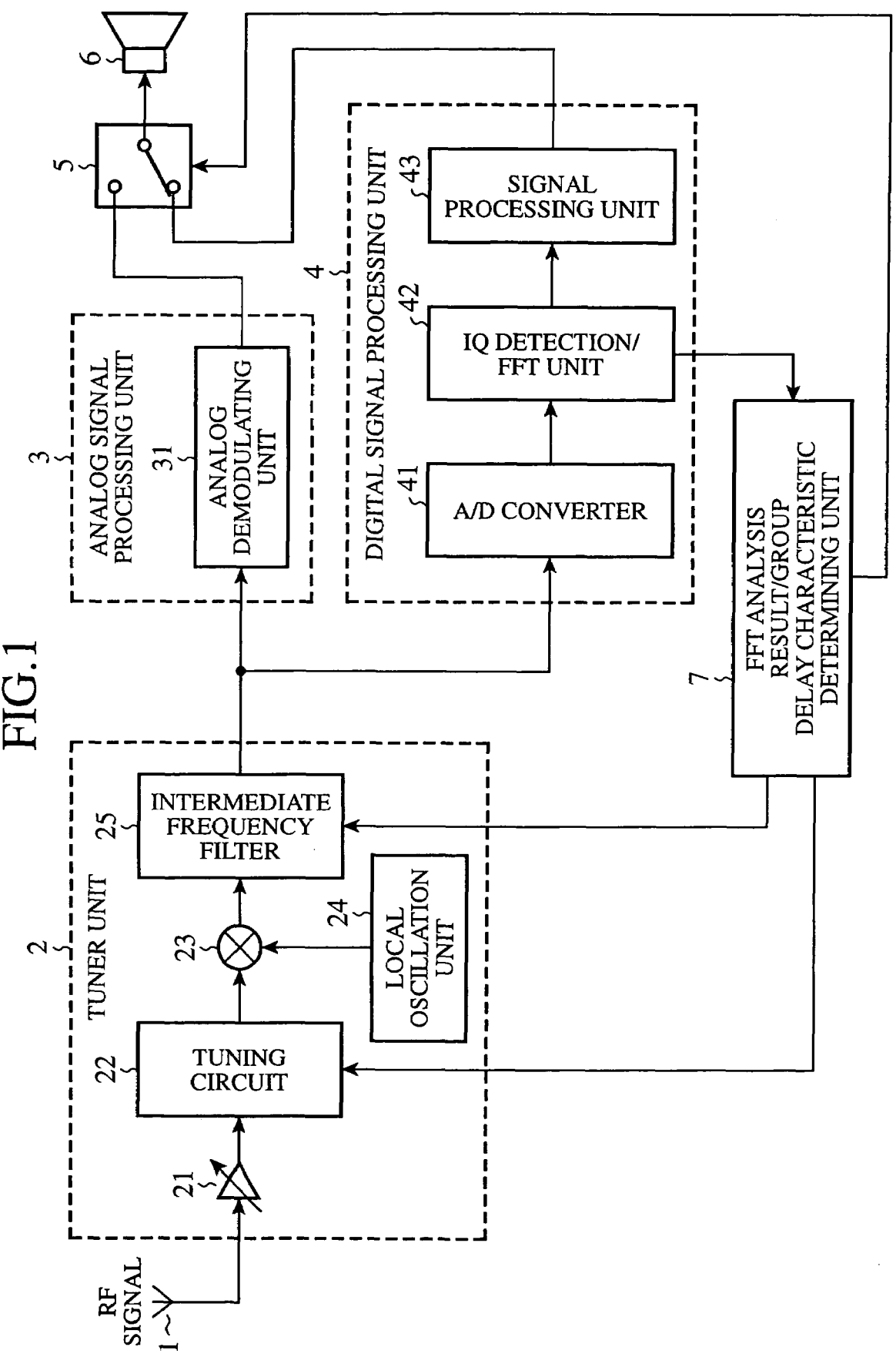
FIG. 1 is a block diagram showing the structure of a receiver in accordance with embodiment 1 of the present invention.

FIG. 1 is a block diagram showing the structure of a receiver in accordance with embodiment 1 of the present invention. This receiver can simultaneously receive RF signals (i.e., high frequency signals) respectively associated with a plurality of channels provided by an IBOC system that can offer both digital broadcast and analog broadcast at the same time. FIG. 2 is a diagram showing a spectrum of an RF signal (or an intermediate frequency signal) containing both an analog broadcasting signal Sa transmitted via a channel of the IBOC system and a digital broadcasting signal Sd having the same centre frequency as the analog broadcasting signal Sa and being divided into two parts arranged on both sides of the analog broadcasting signal Sa with respect to frequency (i.e., in frequency domain). In this case, the analog broadcasting signal Sa can be an FM audio signal which is frequency-modulated, and the digital broadcasting signal Sd can be an OFDM signal, i.e., a digital audio signal that is orthogonal-frequency-division-multiplexed. An OFDM signal complies with a multicarrier modulation method that employs several hundreds of groups of carrier signals. An OFDM signal is generated by converting each of a plurality of frequency-domain carrier signals digitally modulated into a time-domain equivalent by using reverse-fast Fourier transform (i.e., inverse FFT). Therefore, the demodulation of a received OFDM signal into each of a plurality of carrier signals is carried out by converting a time-domain signal into a frequency-domain equivalent by using fast Fourier transform (i.e., FFT).

Next, the structure and operation of the receiver in accordance with embodiment 1 of the present invention as shown in FIG. 1 will be explained. An antenna 1 simultaneously receives a plurality of RF signals respectively associated with a plurality of channels via each of which both a digital broadcast and an analog broadcast are provided, and then supplies them to a tuner unit (i.e., high frequency signal processing means) 2. The tuner unit 2 is provided with an RF amplifier 21, a tuning circuit 22, a mixer circuit 23, a local oscillation unit 24, and an intermediate frequency filter circuit 25. The RF amplifier (i.e., the high frequency amplifier) 21 has an automatic gain control or AGC circuit. The RF amplifier 21 amplifies the RF signals delivered thereto from the antenna 1 and delivers the amplified RF signals to the tuning circuit 22. The tuning circuit 22 selects a channel from among the plurality of channels respectively associated with the plurality of amplified RF signals delivered thereto from the RF amplifier 21. The mixer circuit 23 converts an RF signal associated with the selected channel and output from the tuning circuit 22 by using an oscillation signal delivered thereto from the local oscillation unit 24 into an intermediate frequency signal, and then outputs the intermediate frequency signal to the intermediate frequency filter circuit 25. The intermediate frequency filter circuit 25 removes unnecessary components included in the intermediate frequency signal delivered thereto from the mixer circuit 23, and then outputs the intermediate frequency signal to both an analog signal processing unit 3 and a digital signal processing unit 4.

The analog signal processing unit 3 has an analog demodulating unit 31 for demodulating the intermediate frequency signal delivered thereto from the tuner unit 2 so as to output an audio signal of low frequency. The digital signal processing unit 4 demodulates the intermediate frequency signal delivered thereto from the tuner unit 2 so as to output an audio signal of low frequency, too. The digital signal processing unit 4 includes an A/D converter 41 for converting the intermediate frequency signal delivered thereto from the tuner unit 2 into an equivalent digital signal, and for outputting the digital signal. The digital signal processing unit 4 also includes an IQ detection/FFT unit 42 for performing an IQ detecting process (i.e., an orthogonal detecting process) and an FFT process (i.e., a fast Fourier transform process) on the digital signal delivered thereto from the A/D converter 41, and for outputting a detection signal. The IQ detection/FFT unit 42 also outputs both FFT analysis results each indicating the total power (i.e., a total electric power value) and amplitude of each of a plurality of carrier signals included in the digital broadcasting signal and group delay characteristic information. The digital signal processing unit 4 further includes a signal processing unit 43 for processing the detection signal delivered thereto from the IQ detection/FFT unit 42 so as to generate an audio signal. A switching circuit 5 (i.e., switching means) selects one audio signal from the two audio signals respectively delivered thereto from both the analog signal processing unit 3 and the digital signal processing unit 4 according to a selection control signal from an FFT analysis result/group delay characteristic determining unit 7 and outputs the selected audio signal to a speaker 6.

The FFT analysis result/group delay characteristic determining unit (i.e., carrier wave determining means) 7 determines whether the group of carrier signals satisfies predetermined requirements according to both the FFT analysis results and the group delay characteristic information delivered thereto from the IQ detection/FFT unit 42, and then delivers a requirement satisfaction determination signal indicating the determination result. This requirement satisfaction determination signal includes the selection control signal applied to the switching circuit 5 and two band control signals respectively applied to the tuning circuit 22 of the tuner unit 2 and the intermediate frequency filter circuit 25.

FIGS. 3A and 3B are diagrams each showing a spectrum of the group of carrier signals included in the digital broadcasting signal that is an OFDM signal. FIG. 3A shows a spectrum of the group of carrier signals when the receiver in accordance with embodiment 1 is not under the influence of interfering waves and fading, the spectrum having no difference among the FFT levels of the plurality of carrier signals (i.e., no difference among the amplitudes of the plurality of carrier signals), which are arranged at predetermined intervals of a certain frequency. FIG. 3B shows a spectrum of the group of carrier signals when the receiver in accordance with embodiment 1 is under the influence of interfering waves and fading, the spectrum having a difference among the FFT levels of the plurality of carrier signals, which are arranged at predetermined intervals of a certain frequency.

Figure 4A:
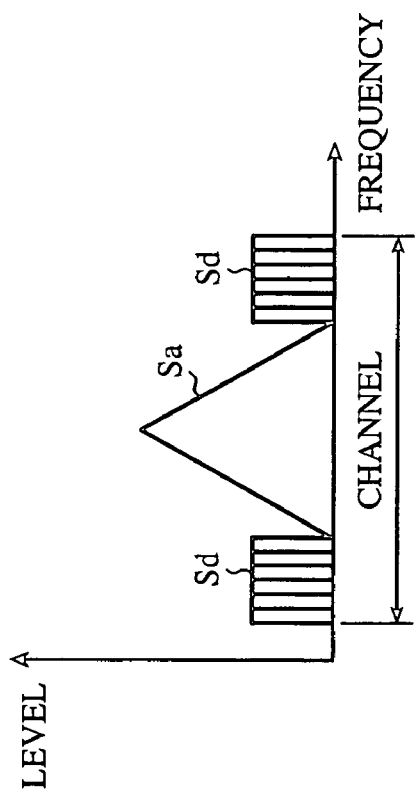
FIG. 4A is a diagram showing a spectrum of an RF signal associated with a selected channel and containing both an analog broadcasting signal Sa and a digital broadcasting signal Sd.
Figure 4C:
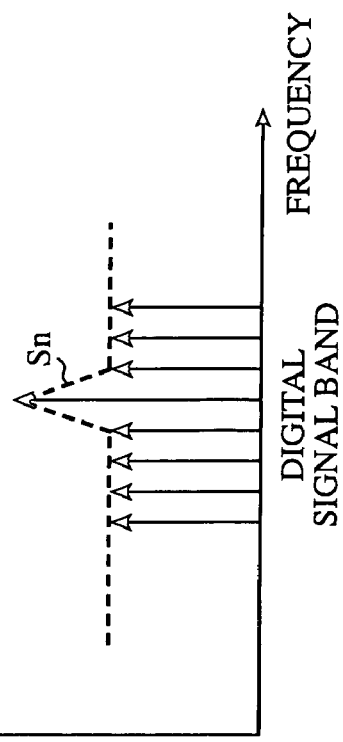
FIG. 4C is a diagram for explaining a group delay characteristic of the group of carrier signals of the digital broadcasting signal included in the RF signal when the receiver in accordance with embodiment 1 of the present invention selectively receives the RF signal as shown in FIG. 4A and is under the influence of interfering waves and fading.
Figure 4B:
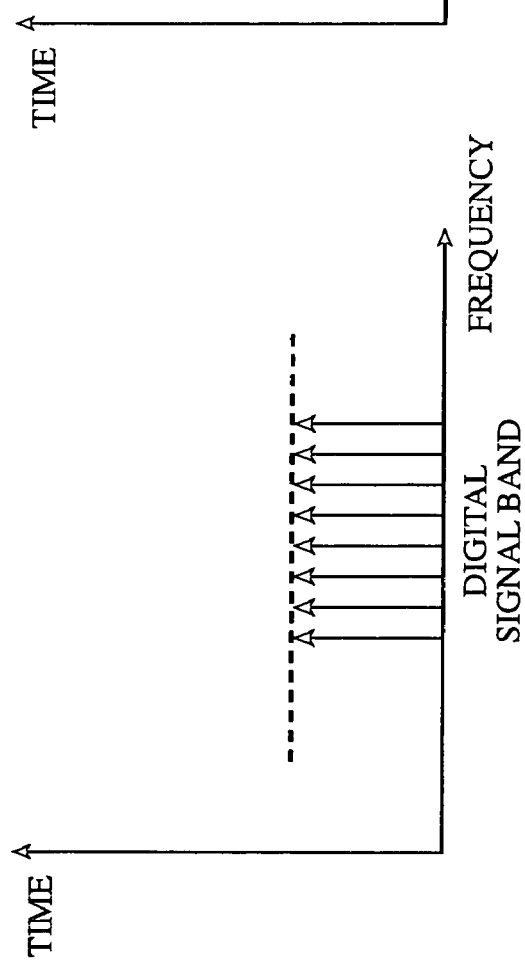
FIG. 4B is a diagram for explaining a group delay characteristic of a group of carrier signals of the digital broadcasting signal included in the RF signal when the receiver in accordance with embodiment 1 of the present invention selectively receives the RF signal as shown in FIG. 4A and is not under the influence of interfering waves and fading.

FIGS. 4A to 4C are diagrams for explaining the group delay characteristic, i.e., phase characteristic of the group of carrier signals included in the digital broadcasting signal that is an OFDM signal. When the receiver is selectively receiving an RF signal, as shown in FIG. 4A, containing both the analog broadcasting signal Sa and the digital broadcasting signal Sd and is not under the influence of interfering waves and fading, the group delays of the plurality of carrier signals included in the digital broadcasting signal and arranged at predetermined intervals of a certain frequency are maintained uniformly, as shown in FIG. 4B. In contrast, when the receiver is selectively receiving the RF signal, as shown in FIG. 4A, containing both the analog broadcasting signal Sa and the digital broadcasting signal Sd and is under the influence of interfering waves and fading, the phases of the plurality of carrier signals included in the digital broadcasting signal and arranged at predetermined intervals of a certain frequency fall into disorder, and there are variations in the group delays of the plurality of carrier signals, as shown in FIG. 4C.

In addition, when the analysis result from the IQ detection/FFT unit 42 indicates that the total power (i.e., the total electric power value) of the group of carrier signals is less than a predetermined value, it becomes difficult for the IQ detection/FFT unit 42 to carry out a proper detection of the digital broadcasting signal. In this case, the receiver needs to switch from the reception of the digital broadcasting signal to the reception of the analog broadcasting signal that servers as backup.

Figure 5:
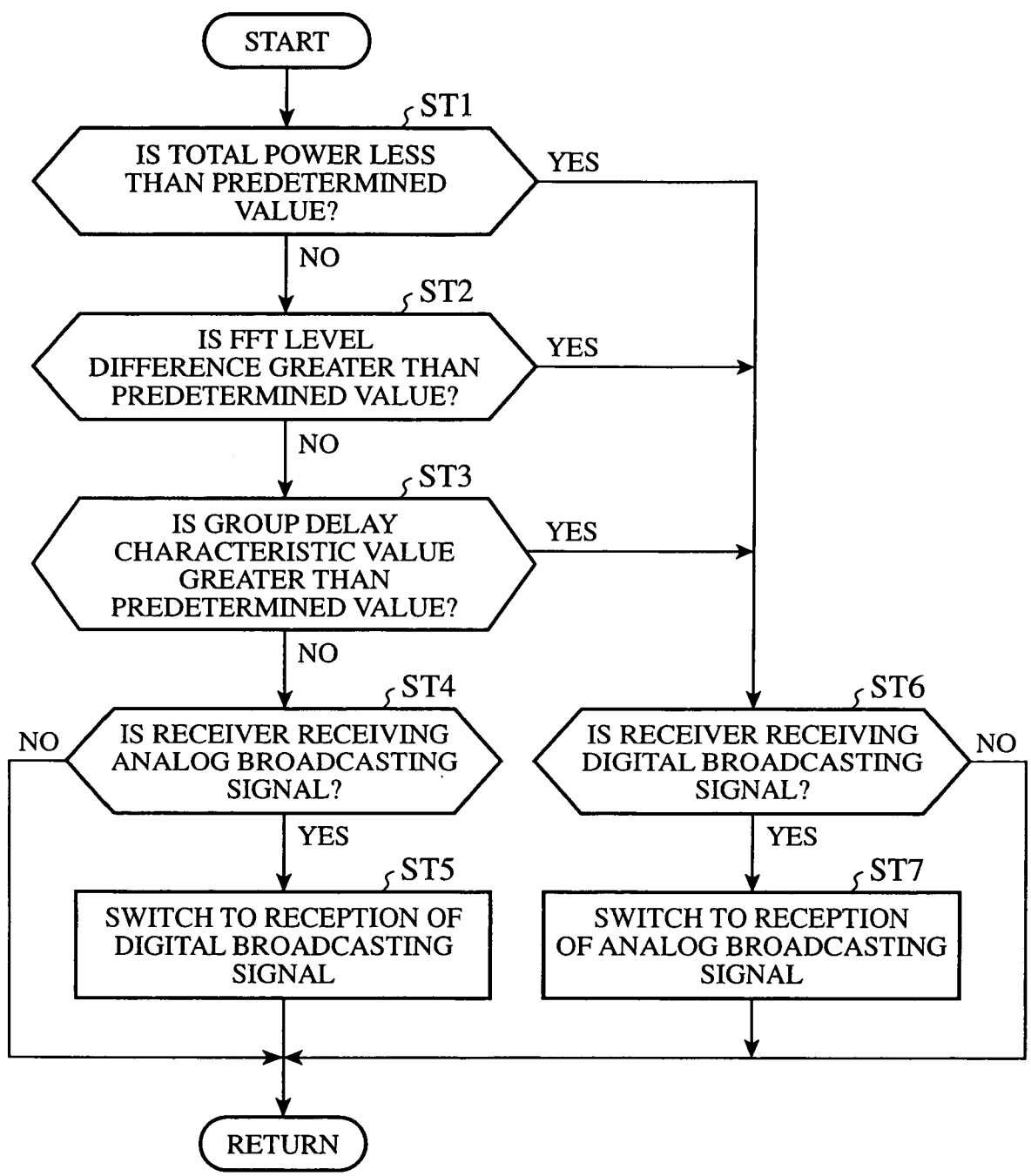
FIG. 5 is a flow chart showing a broadcasting system switching operation of the receiver in accordance with embodiment 1 of the present invention.

FIG. 5 is a flow chart showing the switching between the reception of the analog broadcasting signal and the reception of the digital broadcasting signal, which is performed by the receiver in accordance with embodiment 1 of the present invention. The FFT analysis result/group delay characteristic determining unit 7 determines whether or not the total power of each of the plurality of carrier signals of the digital broadcasting signal is equal to or greater than a predetermined value (in step ST1). When determining that the total power of each of the plurality of carrier signals is equal to or greater than the predetermined value, the FFT analysis result/group delay characteristic determining unit 7 further determines whether or not the difference among the FFT levels of the plurality of carrier signals is equal to or less than a predetermined value (in step ST2). When determining that the difference among the FFT levels of the plurality of carrier signals is equal to or less than the predetermined value, the FFT analysis result/group delay characteristic determining unit 7 further determines whether or not the group delay characteristic value of each of the plurality of carrier signals is equal to or less than a predetermined value (in step ST3). When determining that the group delay characteristic value of each of the plurality of carrier signals is equal to or less than the predetermined value, the FFT analysis result/group delay characteristic determining unit 7 determines whether or not the receiver is selectively receiving the analog broadcasting signal and is outputting the output of the analog signal processing unit (in step ST4). When determining that the receiver is selectively receiving the analog broadcasting signal and is outputting the output of the analog signal processing unit, in step ST4, the FFT analysis result/group delay characteristic determining unit 7 switches from the reception of the analog broadcasting signal to the reception of the digital broadcasting signal (in step ST5). In other words, when the group of carrier signals satisfies all the above-mentioned predetermined requirements, the FFT analysis result/group delay characteristic determining unit 7 switches from the reception of the analog broadcasting signal to the reception of the digital broadcasting signal.

On the other hand, when determining that the total power of each of the plurality of carrier signals is less than the corresponding predetermined value, in step ST1, when determining that the difference among the FFT levels of the plurality of carrier signals is larger than the corresponding predetermined, in step ST2, or when determining that the group delay characteristic value of each of the plurality of carrier signals is larger than the corresponding predetermined, in step ST3, the FFT analysis result/group delay characteristic determining unit 7 determines whether or not the receiver is selectively receiving the digital broadcasting signal and is outputting the output of the digital signal processing unit (in step ST6). When then determining that the receiver is selectively receiving the digital broadcasting signal and is outputting the output of the digital signal processing unit, the FFT analysis result/group delay characteristic determining unit 7 switches from the reception of the digital broadcasting signal to the reception of the analog broadcasting signal (in step ST7). In other words, when the group of carrier signals doesn't satisfy any one of all the above-mentioned predetermined requirements, the FFT analysis result/group delay characteristic determining unit 7 switches from the reception of the digital broadcasting signal to the reception of the analog broadcasting signal.

As mentioned above, in accordance with this embodiment 1, the FFT analysis result/group delay characteristic determining unit 7 determines whether a group of carrier signals of a digital broadcasting signal included in an intermediate frequency signal satisfies predetermined requirements, the intermediate frequency signal also containing an analog broadcasting signal having the same center frequency as the digital broadcasting signal, so as to generate and output a requirement satisfaction determination signal. While the receiver is selectively receiving the digital broadcasting signal and is outputting the output of the digital signal processing unit, the switching circuit 5 switches from the reception of the digital broadcasting signal to the reception of the analog broadcasting signal when the requirement satisfaction determination signal delivered thereto from the FFT analysis result/group delay characteristic determining unit 7 indicates that the group of carrier signals doesn't satisfy anyone of the predetermined requirements. In contrast, while the receiver is selectively receiving the analog broadcasting signal and is outputting the output of the analog signal processing unit, the switching circuit 5 switches from the reception of the analog broadcasting signal to the reception of the digital broadcasting signal when the requirement satisfaction determination signal delivered thereto from the FFT analysis result/group delay characteristic determining unit 7 indicates that the group of carrier signals satisfies all the predetermined requirements. Therefore, the present embodiment offers an advantage of being able to appropriately switch between the reception of the digital broadcasting signal and the reception of the analog broadcasting signal according to the electric wave reception conditions.

As previously mentioned, the FFT analysis result/group delay characteristic determining unit 7 determines whether the group of carrier signals satisfies all of the three requirements based on the FFT results of the plurality of carrier signals arranged at predetermined intervals of a certain frequency, which are obtained by performing a high-speed Fourier transform on the group of carrier signals included in the digital broadcasting signal that is orthogonal-frequency-division-multiplexed. When determining that the group of carrier signals satisfies all of the three requirements, the FFT analysis result/group delay characteristic determining unit 7 enables the receiver to selectively receive the digital broadcasting signal and output the output of the digital signal processing unit. The first requirement is that the total electric power of each of the plurality of carrier signals is equal to or larger than a corresponding predetermined value. The second requirement is that the difference among the amplitudes of the plurality of carrier signals is equal to or smaller than a corresponding predetermined value. The third requirement is that the group delay characteristic value of each of the plurality of carrier signals is equal to or smaller than a corresponding predetermined value. When determining that the group of carrier signals doesn't satisfy any one of the three requirements, the FFT analysis result/group delay characteristic determining unit 7 causes the receiver to selectively receive the analog broadcasting signal and output the output of the analog signal processing unit.

Embodiment 2

In embodiment 2, the details of the structures and operations of a tuning circuit 22 and an intermediate frequency filter circuit 25 of a tuner unit 2 of a receiver having the same structure as that of the embodiment 1 as shown in FIG. 1 will be explained. FIG. 6 is a circuit diagram showing the structure of a part of the receiver in accordance with embodiment 2 of the present invention. In this figure, an antenna 1, an RF amplifier 21, a mixer circuit 23 and an FFT analysis result/group delay characteristic determining unit 7, and an analog signal processing unit, a digital signal processing unit, a switching circuit, etc. not shown in the figure have the same structures as those of embodiment 1 as shown in FIG. 1, respectively.

In the tuning circuit 22, a capacitor C1, an inductance L1, and two resistors R1 and R2, one of which is selected by a switching circuit 11, are connected in parallel. Those components constitute a resonance circuit of the tuning circuit 22. The tuning circuit 2 further includes two diodes D1 and D2 having respective anodes connected to both ends of the resonance circuit, and respective cathodes connected to each other, a DC voltage for controlling the tuning frequency of the tuning circuit being applied to the cathodes of the two diodes D1 and D2. The first resistor R1 has a resistance larger than that of the second resistor R2. Therefore, when the first resistor R1 is selected by the switching circuit 11, the resonance circuit has a smaller Q value than it has when the second resistor R2 is selected.

The intermediate frequency filter circuit 25 is provided with two ceramic filters 8 and 9 that are band-pass filters having different passband characteristics and a switching circuit 10 for selecting one of these two ceramic filters 8 and 9 and then connecting the selected ceramic filter to the output of the intermediate frequency filter circuit 25. The first ceramic filter 8 has a wider passband than the second ceramic filter 9.

The FFT analysis result/group delay characteristic determining unit 7 controls both the switching circuit 11 of the tuning circuit 22 and the switching circuit 19 of the intermediate frequency filter circuit 25 according to a requirement satisfaction determination signal from a digital signal processing unit not shown in the figure. In other words, in order to selectively receive the digital broadcasting signal, the FFT analysis result/group delay characteristic determining unit 7 controls the switching circuit 11 so as to cause the switching circuit 11 to select the first resistor R1, and controls the switching circuit 10 to select the first ceramic filter 8. In contrast, in order to selectively receive the analog broadcasting signal, the FFT analysis result/group delay characteristic determining unit 7 controls the switching circuit 11 so as to cause the switching circuit 11 to select the second resistor R2, and controls the switching circuit 10 to select the second ceramic filter 9. Therefore, a gain vs. frequency band characteristic G(f)1 which the tuner unit exhibits while the receiver is selectively receiving the digital broadcasting signal is wider than a gain vs. frequency band characteristic G(f)2 which the tuner unit exhibits while the receiver is selectively receiving the analog broadcasting signal.

FIG. 7A is a diagram showing a spectrum of an RF signal (or a corresponding intermediate frequency signal) associated with a selected channel when the receiver in accordance with embodiment 2 of the present invention receives a digital broadcast under the influence of analog interfering waves, and FIG. 7B is a diagram showing a spectrum of the RF signal when the receiver in accordance with embodiment 2 of the present invention switches from the reception of the digital broadcast to the reception of an analog broadcast while maintaining the gain vs. frequency band characteristic of the tuner unit at G(f)1, as shown in FIG. 7A. Assuming that the intermediate frequency signal associated with a selected channel contains an analog interfering wave Na having a frequency close to those of an analog broadcasting signal Sa and a digital broadcasting signal Sd having a spectrum including two parts placed on both sides of a spectrum of the analog broadcasting signal Sa, as shown in FIG. 7A, the analog interfering wave Na is not attenuated adequately, as shown in FIG. 7B, when the FFT analysis result/group delay characteristic determining unit 7 switches from the reception of the digital broadcasting signal to the reception of the analog broadcasting signal while maintaining the gain vs. frequency band characteristic of the tuner unit at G(f)1 indicated by a dotted line of FIG. 7A. FIG. 8A is a diagram showing a spectrum of the RF signal associated with a selected channel when the receiver in accordance with embodiment 2 of the present invention receives the digital broadcasting signal under the influence of analog interfering waves, like FIG. 7A, and FIG. 8B is a diagram showing a spectrum of the RF signal when the receiver in accordance with embodiment 2 of the present invention switches from the reception of the digital broadcasting signal to the reception of the analog broadcasting signal after changing the gain vs. frequency band characteristic of the tuner unit from G(f)1 to G(f)2, as shown in FIG. 8A. As shown in FIG. 8A, when the receiver is selectively receiving the digital broadcasting signal, the FFT analysis result/group delay characteristic determining unit 7 sets the gain vs. frequency band characteristic of the tuner unit to G(f)1, and, when switching from the reception of the digital broadcasting signal to the reception of the analog broadcasting signal, changes the gain vs. frequency band characteristic of the tuner unit to G(f)1 to G(f)2 to narrow the frequency band of the tuner unit, so that the analog interfering wave Na is attenuated greatly, as shown in FIG. 8B.

Figure 9:
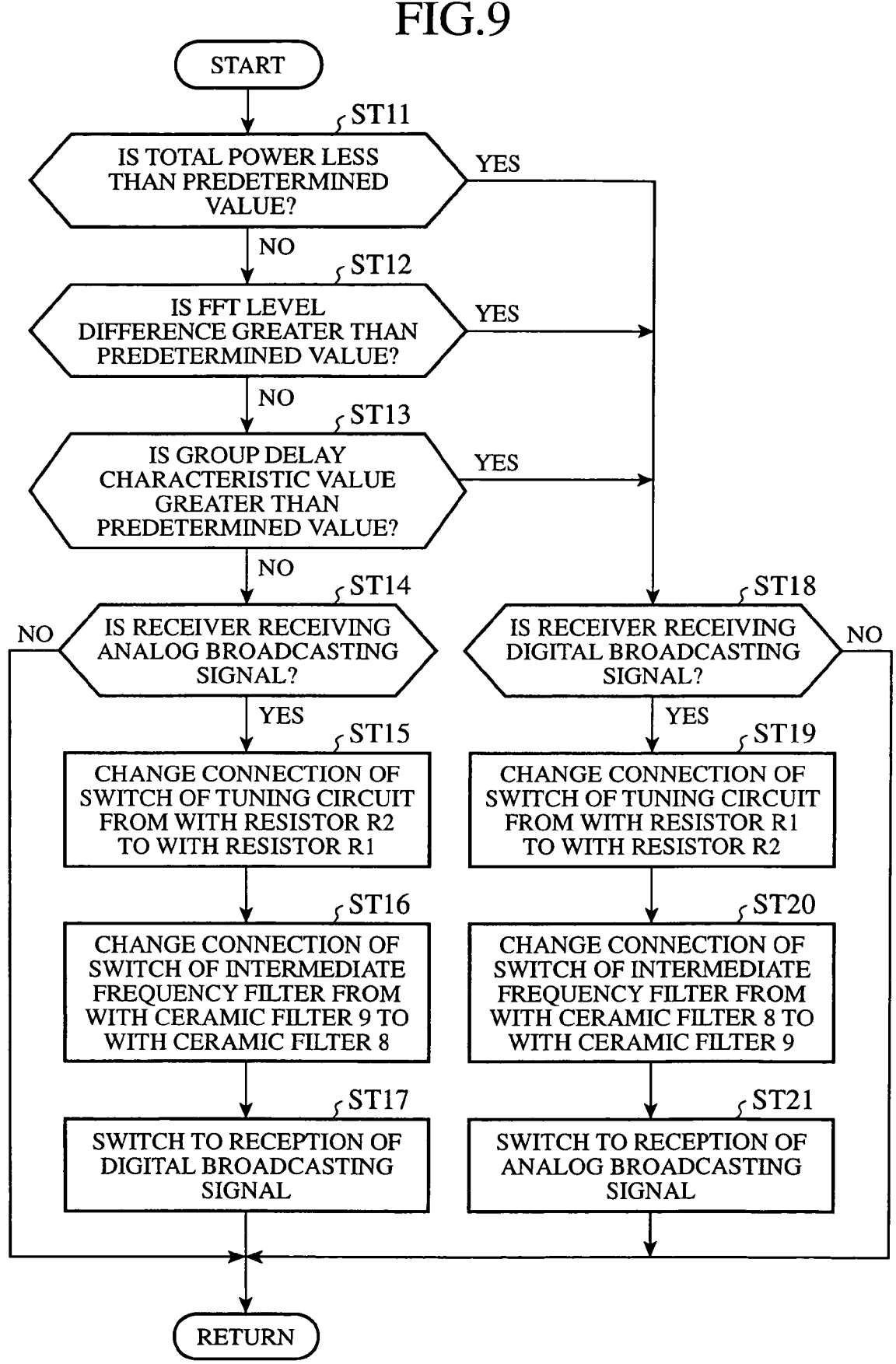
FIG. 9 is a flow chart showing a broadcasting system switching operation of the receiver in accordance with embodiment 2 of the present invention.

FIG. 9 is a flow chart showing the switching between the reception of the analog broadcasting signal and the reception of the digital broadcasting signal, which is performed by the receiver in accordance with embodiment 2 of the present invention. The FFT analysis result/group delay characteristic determining unit 7 determines whether or not the total power of each of the plurality of carrier signals of the digital broadcasting signal is equal to or greater than a predetermined value first (in step ST11). When determining that the total power of each of the plurality of carrier signals is equal to or greater than the predetermined value, the FFT analysis result/group delay characteristic determining unit 7 further determines whether or not the difference among the FFT levels of the plurality of carrier signals is equal to or less than a predetermined value (in step ST12). When determining that the difference among the FFT levels of the plurality of carrier signals is equal to or less than the predetermined value, the FFT analysis result/group delay characteristic determining unit 7 further determines whether or not the group delay characteristic value of each of the plurality of carrier signals is equal to or less than a predetermined value (in step ST13). When determining that the group delay characteristic value of each of the plurality of carrier signals is equal to or less than the predetermined value, the FFT analysis result/group delay characteristic determining unit 7 determines whether or not the receiver is selectively receiving the analog broadcasting signal and is outputting the output of the analog signal processing unit (in step ST14).

When determining that the receiver is selectively receiving the analog broadcasting signal and is outputting the output of the analog signal processing unit, in step ST14, the FFT analysis result/group delay characteristic determining unit 7 switches from the reception of the analog broadcasting signal to the reception of the digital broadcasting signal (in step ST17). In other words, when the group of carrier signals of the digital broadcasting signal satisfies all the above-mentioned predetermined requirements, the FFT analysis result/group delay characteristic determining unit 7 switches from the reception of the analog broadcasting signal to the reception of the digital broadcasting signal. Before this switching, the FFT analysis result/group delay characteristic determining unit 7 changes the connection of the switching circuit 11 of the tuning circuit 22 from with the second resistor R2 to with the first resistor R1 (in step ST15), and then changes the connection of the switching circuit 10 of the intermediate frequency filter circuit 25 from with the second ceramic filter 9 to with the first ceramic filter 8 (in step ST16). The FFT analysis result/group delay characteristic determining unit 7 then switches from the reception of the analog broadcasting signal to the reception of the digital broadcasting signal (in step ST17). In other words, when switching from the reception of the analog broadcasting signal to the reception of the digital broadcasting signal, the FFT analysis result/group delay characteristic determining unit 7 changes the gain vs. frequency band characteristic of the tuner unit from G(f)2 to G(f)1.

On the other hand, when determining that the total power of each of the plurality of carrier signals is less than the corresponding predetermined value, in step ST11, when determining that the difference among the FFT levels of the plurality of carrier signals is larger than the corresponding predetermined, in step ST12, or when determining that the group delay characteristic value of each of the plurality of carrier signals is larger than the corresponding predetermined, in step ST13, the FFT analysis result/group delay characteristic determining unit 7 determines whether or not the receiver is selectively receiving the digital broadcasting signal and is outputting the output of the digital signal processing unit (in step ST18).

When then determining that the receiver is selectively receiving the digital broadcasting signal and is outputting the output of the digital signal processing unit, the FFT analysis result/group delay characteristic determining unit 7 switches from the reception of the digital broadcasting signal to the reception of the analog broadcasting signal (in step ST21). In other words, when the group of carrier signals of the digital broadcasting signal doesn't satisfy any one of all the above-mentioned predetermined requirements, the FFT analysis result/group delay characteristic determining unit 7 switches from the reception of the digital broadcasting signal to the reception of the analog broadcasting signal. Before this switching, the FFT analysis result/group delay characteristic determining unit 7 changes the connection of the switching circuit 11 of the tuning circuit 22 from with the first resistor R1 to with the second resistor R2 (in step ST19), and then changes the connection of the switching circuit 10 of the intermediate frequency filter circuit 25 from with the first ceramic filter 8 to with the second ceramic filter 9 (in step ST20). The FFT analysis result/group delay characteristic determining unit 7 then switches from the reception of the digital broadcasting signal to the reception of the analog broadcasting signal (in step ST21). In other words, when switching from the reception of the digital broadcasting signal to the reception of the analog broadcasting signal, the FFT analysis result/group delay characteristic determining unit 7 changes the gain vs. frequency band characteristic of the tuner unit from G(f)1 to G(f)2.

As mentioned above, in accordance with this embodiment 2, when the group of carrier signals, of the digital broadcasting signal satisfies all the predetermined requirements, the FFT analysis result/group delay characteristic determining unit 7 switches from the reception of the analog broadcasting signal to the reception of the digital broadcasting signal, and delivers a band control signal indicating an instruction for widening the frequency band of the intermediate frequency signal to the tuner unit before performing the switching. In contrast, when the group of carrier signals doesn't satisfy any one of all the predetermined requirements, the FFT analysis result/group delay characteristic determining unit 7 switches from the reception of the digital broadcasting signal to the reception of the analog broadcasting signal, and delivers the band control signal indicating an instruction for narrowing the frequency band of the intermediate frequency signal to the tuner unit before performing the switching. Therefore, the second embodiment of the present invention provides an advantage of being able to carry out appropriate control of the frequency band of the intermediate frequency signal when the receiver accepts both digital broadcast and analog broadcast at the same time.

In this case, the FFT analysis result/group delay characteristic determining unit 7 delivers a band control signal indicating an instruction for controlling the resonance Q-value of the tuning circuit 22 of the tuner unit to the tuner unit. The FFT analysis result/group delay characteristic determining unit 7 also delivers another band control signal indicating an instruction for controlling the filtering characteristic of the intermediate frequency filter circuit 25 of the tuner unit to the tuner unit.

Figure 10A:
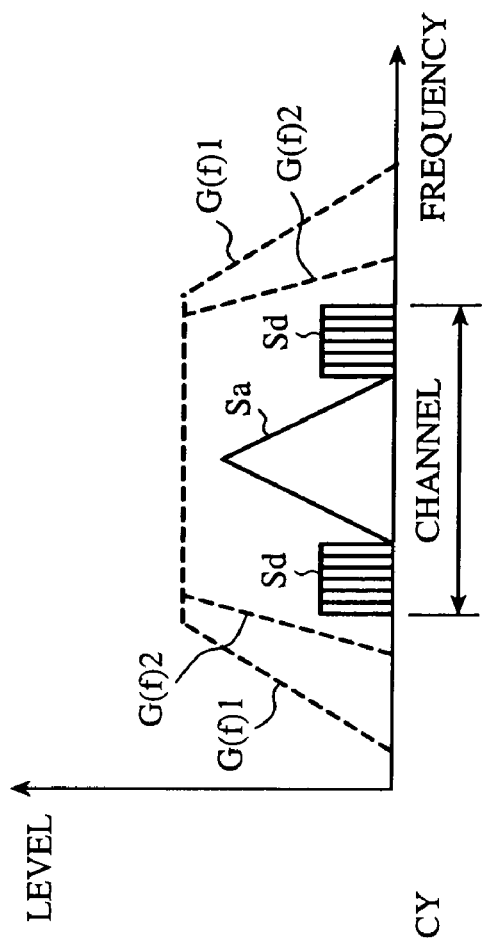
FIG. 10A is a diagram showing a spectrum of the RF signal when the receiver in accordance with embodiment 2 of the present invention receives an analog broadcast.
Figure 10B:
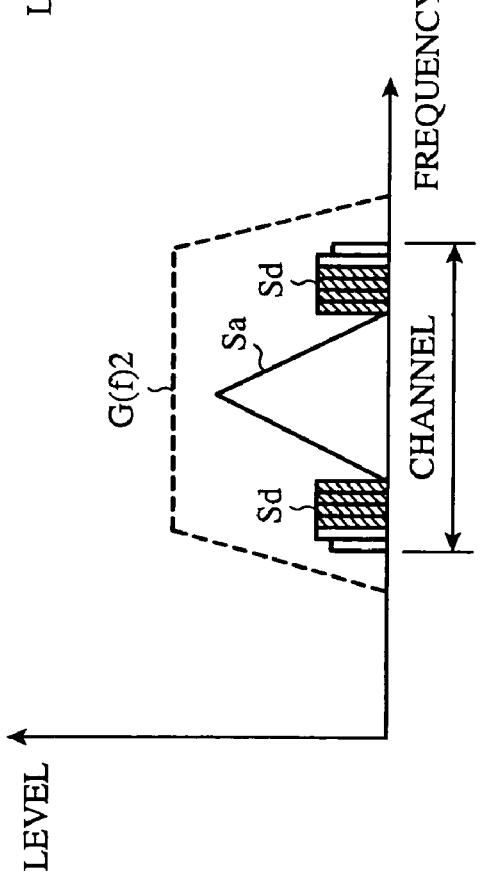
FIG. 10B is a diagram showing a spectrum of the RF signal when the receiver in accordance with embodiment 2 of the present invention switches from the reception of the analog broadcast to reception of a digital broadcast after changing the gain vs. frequency band characteristic of a tuner unit from G(f)2 to G(f)1.

When the gain vs. frequency band characteristic of the tuner unit is set to G(f)2, the group of carrier signals of the digital broadcasting signal is also affected by the narrowing of the frequency band of the intermediate frequency signal. FIG. 10A is a diagram showing a spectrum of the RF signal associated with a selected channel when the receiver is selectively receiving the analog broadcasting signal, and FIG. 10B is a diagram showing a spectrum of the RF signal when the FFT analysis result/group delay characteristic determining unit 7 switches from the reception of the analog broadcasting signal to the reception of the digital broadcasting signal after changing the gain vs. frequency band characteristic of the tuner unit from G(f)2 to G(f)1. When the gain vs. frequency band characteristic G(f)2 showing a narrow frequency band is set to the tuner unit upon the reception of the analog broadcasting signal, a part of the digital broadcasting signal Sd is attenuated, as shown in FIG. 10A. A large amount of attenuation of the digital broadcasting signal Sd makes it impossible for the FFT analysis result/group delay characteristic determining unit 7 to accurately determine the status of the group of carrier signals. As a result, the FFT analysis result/group delay characteristic determining unit 7 cannot accurately determine whether to switch from the reception of the analog broadcasting signal to the reception of the digital broadcasting signal.

To resolve this trouble, when switching between the reception of the analog broadcasting signal and the reception of the digital broadcasting signal, the FFT analysis result/group delay characteristic determining unit 7 delivers a band control signal indicating an instruction for changing the gain vs. frequency band characteristic of the tuner unit such that the FFT analysis result/group delay characteristic determining unit 7 can determine whether the group of carrier signals of the digital broadcasting signal satisfies all the predetermined requirements to the tuner unit.

Embodiment 3

Figure 11:
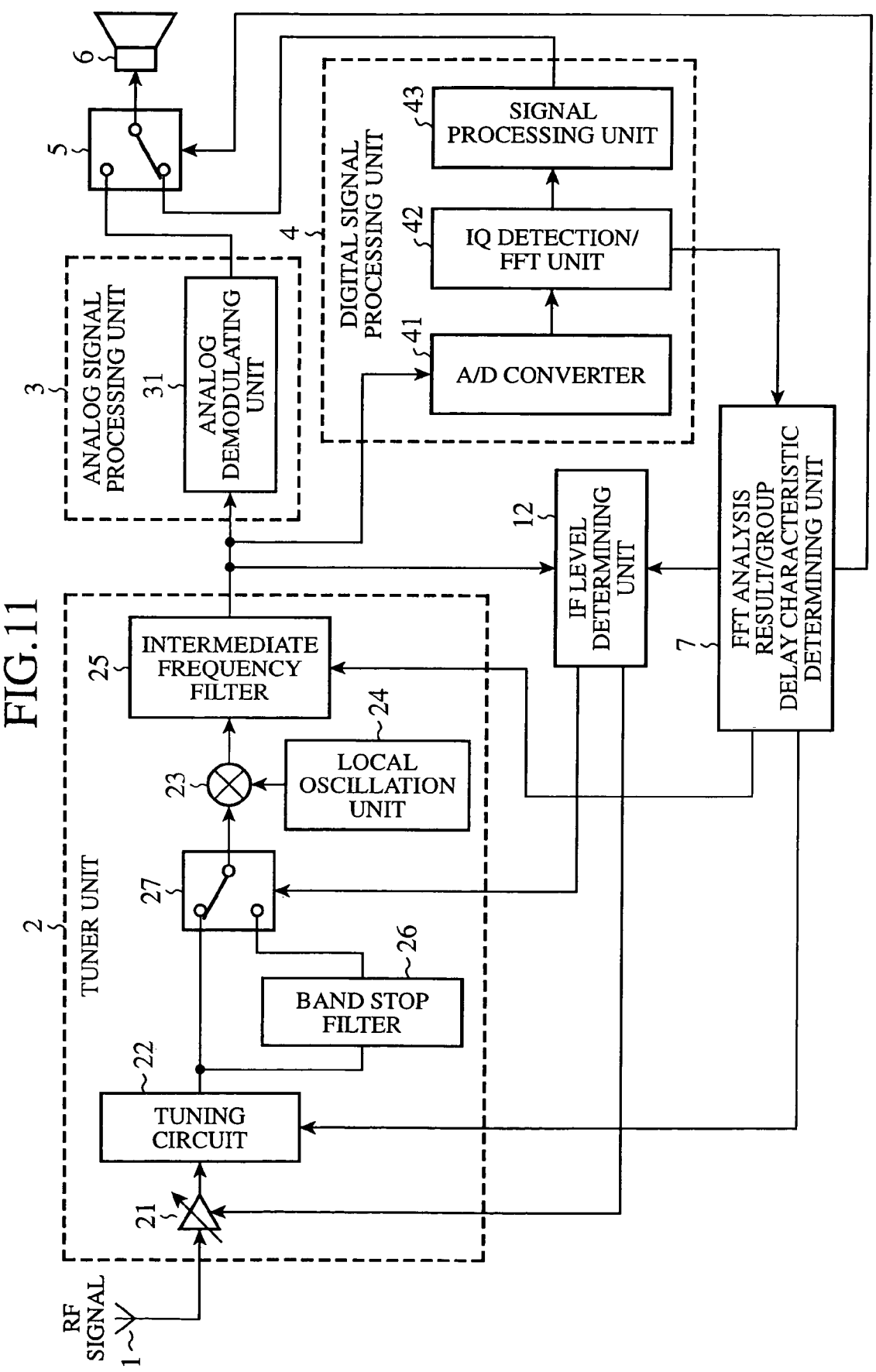
FIG. 11 is a block diagram showing the structure of a receiver in accordance with embodiment 3 of the present invention.

FIG. 11 is a circuit diagram showing the structure of a part of a receiver in accordance with embodiment 3 of the present invention. In this figure, the same components as those of embodiment 1 shown in FIG. 1 are designated by the same reference numerals, and therefore the explanation of those components will be omitted hereafter. In a tuner unit 2 of the receiver of FIG. 11, both a band stop filter circuit 26 and a switching circuit 27 for inserting the band stop filter circuit 26 between a tuning circuit 22 and a mixer circuit 23, or directly connecting the tuning circuit 22 to the mixer circuit 23 are newly added. The receiver further includes an IF level determining unit 12 (i.e., intermediate frequency signal determining means) for determining the level of an intermediate frequency signal associated with a selected channel and delivered thereto from an intermediate frequency filter circuit 25 of the tuner unit 2. The IF level determining unit 12 delivers an AGC or gain control signal to an RF amplifier 21 of the tuner unit 2 according to a band control signal delivered thereto from an FFT analysis result/group delay characteristic determining unit 7, and delivers a connection control signal to the switching circuit 27.

FIGS. 12A to 12C are diagrams showing a transition of a spectrum of the intermediate frequency signal when the IF level determining unit 12 delivers the AGC signal to the RF amplifier 21 according to only the level of the intermediate frequency signal delivered thereto from the intermediate frequency filter circuit 25 without receiving the band control signal from the FFT analysis result/group delay characteristic determining unit 7. When the intermediate frequency signal contains both an analog broadcasting signal Sa having a large level and a digital broadcasting signal Sd having a normal level, as shown in FIG. 12A, the IF level determining unit 12 determines that a part of the analog broadcasting signal Sa having a level that is larger than a saturated level Lm corresponds to an amount of AGC of the analog broadcasting signal Sa that has to be attenuated, as shown in FIG. 12B. When the IF level determining unit 12 then delivers the AGC signal indicating the amount of AGC to the RF amplifier 21, the level of the analog broadcasting signal Sa becomes smaller than the saturated level Lm and the level of the digital broadcasting signal Sd is attenuated, too, as shown in FIG. 12C. As a result, the FFT analysis result/group delay characteristic determining unit 7 cannot accurately determine the status of the group of carrier signals of the digital broadcasting signal.

FIGS. 13A to 13C are diagrams showing a transition of a spectrum of the intermediate frequency signal when the IF level determining unit 12 delivers the AGC signal to the RF amplifier 21 according to both the band control signal from the FFT analysis result/group delay characteristic determining unit 7 and the level of the intermediate frequency signal delivered thereto from the intermediate frequency filter circuit 25. In FIG. 13A, G(f)3 shown by a dotted line represents a gain vs. frequency band characteristic of the band stop filter circuit 26. When the FFT analysis result/group delay characteristic determining unit 7 determines that it should switch to the reception of the analog broadcasting signal, and then delivers an attenuation control signal to the IF level determining unit 12, the IF level determining unit 12 delivers the connection control signal indicating an instruction for inserting the band stop filter circuit 26 between the tuning circuit 22 and the mixer circuit 23 to the switching circuit 27.

As a result, the band stop filter circuit 26 attenuates the level of the analog broadcasting signal Sa according to its gain vs. frequency band characteristic G(f)3, as shown in FIG. 13B, and the amount of AGC of the analog broadcasting signal Sa that has to be attenuated becomes smaller than that in the case of FIG. 12B. Under this condition, when the IF level determining unit 12 delivers the AGC signal to the RF amplifier 21, the level of the digital broadcasting signal Sd is attenuated only slightly while the level of the analog broadcasting signal Sa becomes smaller than the saturated level Lm, as shown in FIG. 13C. As a result, the FFT analysis result/group delay characteristic determining unit 7 can accurately determine the status of the group of carrier signals of the digital broadcasting signal.

Figure 14:
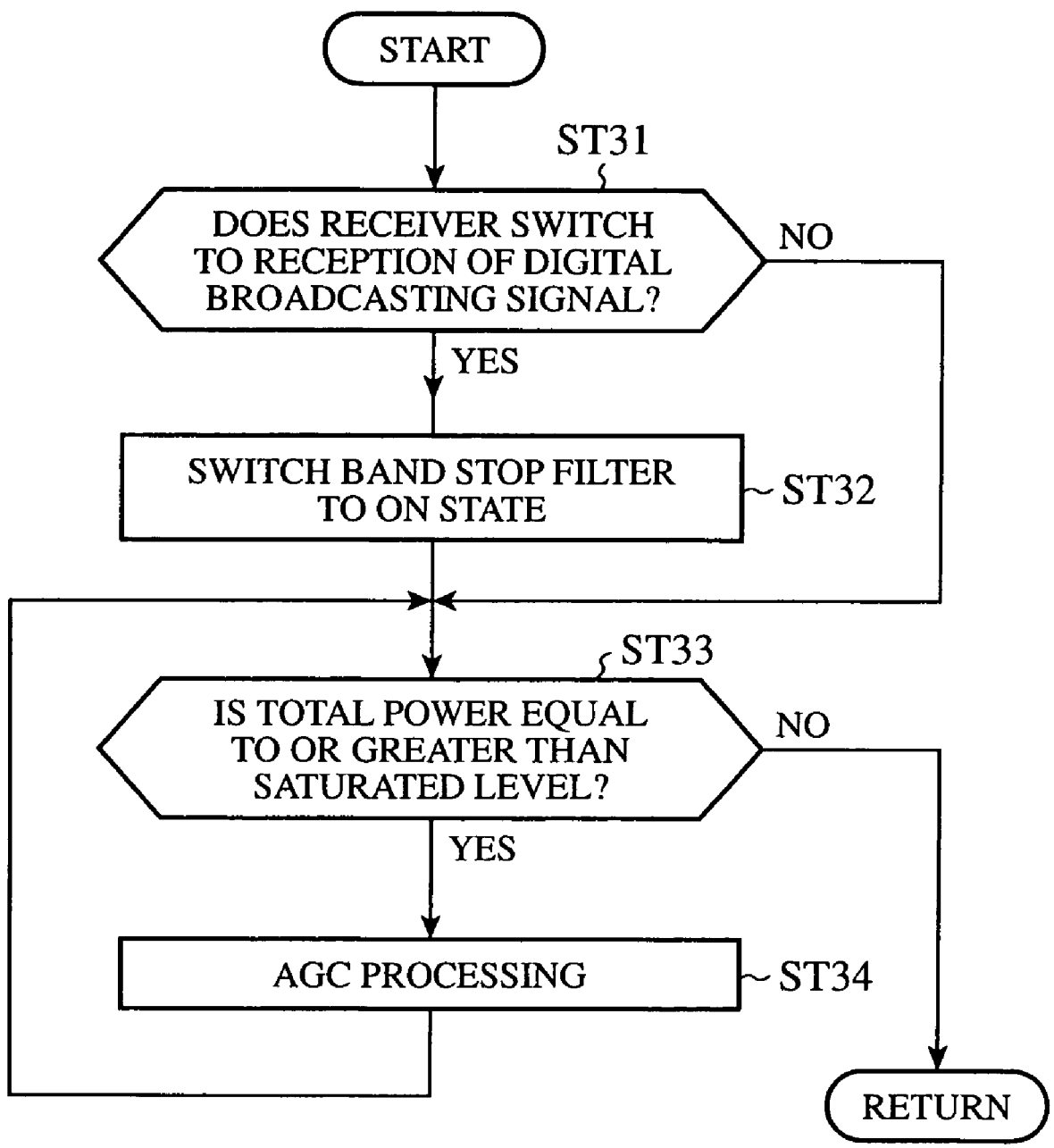
FIG. 14 is a flow chart showing a level control operation of a receiver in accordance with embodiment 3 of the present invention.

FIG. 14 is a flow chart showing a level control operation of the receiver in accordance with embodiment 3 of the present invention. The IF level determining unit 12 determines whether the FFT analysis result/group delay characteristic determining unit 7 has switched from the reception of the analog broadcasting signal to the reception of the digital broadcasting signal first (in step ST31). When determining that the FFT analysis result/group delay characteristic determining unit 7 has switched from the reception of the analog broadcasting signal to the reception of the digital broadcasting signal, the IF level determining unit 12 delivers the connection control signal to the switching circuit 27 so as to switch the band stop filter circuit 26 to anon state (i.e., a state in which the band stop filter circuit 26 is inserted between the tuning circuit 22 and the mixer circuit 23) (in step ST32). After performing this switching or when determining that the FFT analysis result/group delay characteristic determining unit 7 has not switched to the reception of the digital broadcasting signal and the receiver is selectively receiving the analog broadcasting signal, the IF level determining unit 12 determines whether or not the total power of the intermediate frequency signal is equal to or larger than the saturated level Lm (in step ST33). When determining that the total power of the intermediate frequency signal is equal to or larger than the saturated level Lm, the IF level determining unit 12 carries out AGC processing so as to deliver the AGC signal to the RF amplifier 21 (in step ST34).

As mentioned above, in accordance with this embodiment 3, when the group of carrier signals of the digital broadcasting signal satisfies all the predetermined requirements, the IF level determining unit 12 generates an attenuation control signal indicating an instruction for attenuating the predetermined band including the centre frequency of the RF signal associated with a channel selected by the tuner unit 2. Therefore, this embodiment 3 offers an advantage of being able to proper gain control when accepting both digital broadcast and analog broadcast at the same time.

In this case, the IF level determining unit 12 determines whether or not the amplitude of the intermediate frequency signal delivered thereto from the tuner unit 2 is larger than the saturated level Lm, which is a predetermined value. When determining that the amplitude of the intermediate frequency signal is larger than the saturated level Lm, the IF level determining unit 12 delivers a connection control signal indicating an instruction for inserting the band stop filter circuit 26 between the tuning circuit 22 and the mixer circuit 23 to the switching circuit 27 of the tuner unit 2 according to an attenuation control signal delivered thereto from the FFT analysis result/group delay characteristic determining unit 7.

In this case, when determining that the amplitude of the intermediate frequency signal is larger than the saturated level Lm after delivering the connection control signal to the tuner unit 2, or when determining that the amplitude of the intermediate frequency signal is larger than the saturated level Lm and the IF level determining unit 12 does not receive the attenuation control signal from the FFT analysis result/group delay characteristic determining unit 7, the IF level determining unit 12 delivers the AGC signal indicating an instruction for attenuating the gain for the RF signal to be supplied to the tuning circuit 22 to the RF amplifier 21 of the tuner unit 2. Thus embodiment 3 offers an advantage of being able to appropriately switch between the reception of the digital broadcasting signal and the reception of the analog broadcasting signal according to the electric wave reception conditions.

Many widely different embodiments of the present invention may be constructed without departing from the spirit and scope of the present invention. It should be understood that the present invention is not limited to the specific embodiments described in the specification, except as defined in the appended claims.

What is claimed is:

1. A receiver that accepts a high frequency signal containing both a digital broadcasting signal and an analog broadcasting signal which are associated with one channel and converts the high frequency signal into an intermediate frequency signal, said receiver comprising:

carrier determining means for determining whether a group of carrier signals of said digital broadcasting signal, which is included in said intermediate frequency signal, satisfies a predetermined requirement so as to generate a requirement satisfaction determination signal indicating a determination result; and switching means for, when the requirement satisfaction determination signal delivered thereto from said carrier determination means indicates that the group of carrier signals does not satisfy said predetermined requirement while said receiver is receiving the digital broadcasting signal, switching to reception of the analog broadcasting signal, and for, when the requirement satisfaction determination signal delivered thereto from said carrier determination means indicates that the group of carrier signals satisfies said predetermined requirement while said receiver is receiving the analog broadcasting signal, switching to reception of the digital broadcasting signal.

2. The receiver according to claim 1, wherein the digital broadcasting signal is an orthogonal-frequency-division-multiplexed signal, and said carrier determining means outputs a requirement satisfaction determination signal indicating that the group of carrier signals doesn't satisfy said predetermined requirement when a total of electric power of each of the plurality of carrier signals arranged at predetermined intervals of a certain frequency, which is obtained by performing a high-speed Fourier transform on the group of carrier signals of the digital broadcasting signal, is less than a predetermined value.

3. The receiver according to claim 1, wherein the digital broadcasting signal is an orthogonal-frequency-division-multiplexed signal, and said carrier determining means outputs a requirement satisfaction determination signal indicating that the group of carrier signals doesn't satisfy said predetermined requirement when a difference among amplitudes of the plurality of carrier signals arranged at predetermined intervals of a certain frequency, which is obtained by performing a high-speed Fourier transform on the group of carrier signals of the digital broadcasting signal, is greater than a predetermined value.

4. The receiver according to claim 1, wherein the digital broadcasting signal is an orthogonal-frequency-division-multiplexed signal, and said carrier determining means outputs a requirement satisfaction determination signal indicating that the group of carrier signals doesn't satisfy said predetermined requirement when a group delay characteristic value of each of the plurality of carrier signals arranged at predetermined intervals of a certain frequency, which is obtained by performing a high-speed Fourier transform on the group of carrier signals of the digital broadcasting signal, is greater than a predetermined value.

5. The receiver according to claim 1, further comprising high frequency signal processing means for selecting said channel from among a plurality of channels respectively associated with a plurality of high frequency signals, said plurality of channels having different centre frequencies, each of the plurality of high frequency signals containing a digital broadcasting signal and an analog broadcasting signal, and for generating and outputting the intermediate frequency signal including the digital broadcasting signal and the analog broadcasting signal associated with the selected channel, wherein said carrier determining means delivers a band control signal causing said high frequency signal processing means to widen a frequency band of the intermediate frequency signal to said high frequency signal processing means when the group of carrier signals satisfies said predetermined requirement, and delivers a band control signal causing said high frequency signal processing means to narrow the frequency band of the intermediate frequency signal to said high frequency signal processing means otherwise.

6. The receiver according to claim 5, wherein said carrier determining means delivers a band control signal indicating an instruction for controlling a resonance Q-value of a tuning circuit included in said high frequency signal processing means to said high frequency signal processing means.

7. The receiver according to claim 5, wherein said carrier determining means delivers a band control signal indicating an instruction for controlling a filtering characteristic of an intermediate frequency filter included in said high frequency signal processing means to said high frequency signal processing means.

8. The receiver according to claim 5, wherein said carrier determining means delivers a band control signal indicating an instruction for changing the frequency band of the intermediate frequency signal so as to enable said carrier determining means to determine whether the group of carrier signals of said digital broadcasting signal satisfies the predetermined requirement.

9. The receiver according to claim 1, further comprising high frequency signal processing means for selecting said channel from among a plurality of channels respectively associated with a plurality of high frequency signals, said plurality of channels having different centre frequencies, each of the plurality of high frequency signals containing a digital broadcasting signal and an analog broadcasting signal, and for generating and outputting the intermediate frequency signal containing the digital broadcasting signal and the analog broadcasting signal associated with the selected channel, wherein when the group of carrier signals satisfies the predetermined requirement, said carrier determining means generates an attenuation control signal indicating an instruction for attenuating a predetermined band including a centre frequency of the high frequency signal associated with said channel selected by said high frequency signal processing means.

10. The receiver according to claim 9, further comprising intermediate frequency signal determining means for determining whether the intermediate frequency signal delivered thereto from said high frequency signal processing means has an amplitude larger than a predetermined value, and for delivering a connection control signal indicating an instruction fro inserting a band stop filter circuit between a tuning circuit and a mixer circuit included in said high frequency signal processing means according to the attenuation control signal delivered thereto from said carrier determining means when determining that the intermediate frequency signal has an amplitude larger than the predetermined value to said high frequency signal processing means.

11. The receiver according to claim 10, wherein when determining that the intermediate frequency signal has an amplitude larger than the predetermined value after delivering the connection control signal to said high frequency signal processing means, or when determining that the intermediate frequency signal has an amplitude larger than the predetermined value and no attenuation control signal is applied thereto from said carrier determining means, said intermediate frequency signal determining means delivers a gain control signal indicating an instruction for reducing a gain for the high frequency signal associated with the selected channel to a high frequency amplifier included in said high frequency signal processing means, said high frequency amplifier amplifying and delivering the high frequency signal to said tuning circuit.

* * * * *